(12) United States Patent
Inoue et al.

(10) Patent No.: US 7,157,128 B2
(45) Date of Patent: Jan. 2, 2007

(54) OPTICAL INFORMATION RECORDING MEDIUM

(75) Inventors: Hiroyasu Inoue, Tokyo (JP); Koji Mishima, Tokyo (JP); Masaki Aoshima, Tokyo (JP); Hideki Hirata, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 80 days.

(21) Appl. No.: 10/896,110

(22) Filed: Jul. 22, 2004

(65) Prior Publication Data

US 2005/0018591 A1    Jan. 27, 2005

(30) Foreign Application Priority Data

Jul. 23, 2003    (JP) .............................. 2003-200198

(51) Int. Cl.
*B32B 3/02* (2006.01)
*G11B 13/00* (2006.01)

(52) U.S. Cl. ................... 428/64.4; 428/64.2; 428/64.6; 369/275.2

(58) Field of Classification Search ............... 428/64.2, 428/64.4, 64.6; 369/275.2
See application file for complete search history.

(56) References Cited

U.S. PATENT DOCUMENTS

| | | | |
|---|---|---|---|
| 3,959,799 A | 5/1976 | Cambino et al. | |
| 4,357,616 A | 11/1982 | Terao et al. | |
| 4,477,819 A | 10/1984 | Lee et al. | |
| 4,587,533 A | 5/1986 | Nakane et al. | |
| 4,647,947 A | 3/1987 | Takeoka et al. | |
| 4,670,345 A | 6/1987 | Morimoto et al. | |
| 4,771,413 A | 9/1988 | Nago | |
| 4,772,897 A | 9/1988 | Ohkawa | |
| 5,208,088 A | 5/1993 | Tominga et al. | |
| 5,297,132 A | 3/1994 | Takano et al. | |
| 5,325,351 A | 6/1994 | Uchiyama et al. | |
| 5,401,330 A | 3/1995 | Saito et al. | |
| 5,458,941 A | 10/1995 | Hintz | |
| 5,656,370 A | 8/1997 | Murakami et al. | |
| 5,912,104 A | 6/1999 | Hirotsune et al. | |
| 6,033,752 A | 3/2000 | Yoshinai et al. | |
| 6,096,399 A | 8/2000 | Yoshinai et al. | |
| 6,111,851 A | 8/2000 | Ohki et al. | |
| 6,143,469 A | 11/2000 | Ohta et al. | |
| 6,210,860 B1 | 4/2001 | Fukano et al. | |
| 6,254,966 B1 | 7/2001 | Kondo | |
| 6,355,326 B1 | 3/2002 | Lee et al. | |
| 6,551,679 B1 | 4/2003 | Kuroda et al. | |
| 6,608,799 B1 | 8/2003 | Hozumi | |
| 2001/0012257 A1 | 8/2001 | Suzuki et al. | |
| 2001/0021160 A1 | 9/2001 | Shuy et al. | |
| 2001/0044002 A1 | 11/2001 | Shingai et al. | |
| 2002/0076646 A1 | 6/2002 | Zhou et al. | |
| 2003/0190551 A1* | 10/2003 | Aoshima et al. ........ 430/270.12 | |
| 2003/0202452 A1 | 10/2003 | Minshima et al. | |
| 2004/0038080 A1 | 2/2004 | Inoue et al. | |
| 2004/0052194 A1 | 3/2004 | Inoue et al. | |
| 2004/0076907 A1* | 4/2004 | Inoue et al. ........... 430/270.12 | |
| 2004/0110086 A1 | 6/2004 | Kakiuchi et al. | |
| 2004/0152016 A1* | 8/2004 | Mishima et al. ....... 430/270.12 | |
| 2004/0157158 A1* | 8/2004 | Kakiuchi et al. ...... 430/270.12 | |
| 2004/0174796 A1* | 9/2004 | Mizushima et al. .......... 369/94 | |
| 2004/0174804 A1* | 9/2004 | Kakiuchi et al. ........ 369/275.4 | |
| 2005/0018591 A1 | 1/2005 | Inoue et al. | |
| 2005/0047301 A1 | 3/2005 | Inoue et al. | |
| 2005/0047304 A1 | 3/2005 | Inoue et al. | |
| 2005/0047306 A1 | 3/2005 | Inoue et al. | |

FOREIGN PATENT DOCUMENTS

| | | |
|---|---|---|
| CN | 1330368 | 1/2002 |
| EP | 0068801 | 9/1986 |
| EP | 0474311 | 3/1992 |
| EP | 0350078 | 3/1994 |
| EP | 0822543 | 2/1998 |
| EP | 0978831 | 3/2000 |
| EP | 1028421 | 8/2000 |
| EP | 1139340 | 10/2001 |
| EP | 1154413 | 11/2001 |
| EP | 1172811 | 1/2002 |
| EP | 1178472 | 2/2002 |
| EP | 0947351 | 9/2002 |
| EP | 1351230 | 10/2003 |
| JP | 57-22095 | 2/1982 |
| JP | 57-27788 | 2/1982 |
| JP | 58-220794 | 12/1983 |

(Continued)

OTHER PUBLICATIONS

English Language Abstract of JP 62-204442.

(Continued)

*Primary Examiner*—Rena Dye
*Assistant Examiner*—Lawrence D. Ferguson
(74) *Attorney, Agent, or Firm*—Greenblum & Bernstein, P.L.C.

(57) ABSTRACT

An optical information recording medium which is capable of performing high-density recording of record data, and storing the recorded data for a long time period such that the recorded data can be normally reproduced during the long time period. An optical information recording medium has a recording layer formed on a substrate, for having a laser beam irradiated thereto for recording and reproduction of record data. The recording layer includes a first sub-recording film and a second sub-recording film. The first sub-recording film is formed of a first material containing Si as the main component. The second sub-recording film is formed of a second material containing Cu as the main component and having Si added thereto, and disposed in the vicinity of the first recording film.

12 Claims, 2 Drawing Sheets

FOREIGN PATENT DOCUMENTS

| | | |
|---|---|---|
| JP | 59-225992 | 12/1984 |
| JP | 60-160036 | 8/1985 |
| JP | 62-204442 | 9/1987 |
| JP | 62-245545 | 10/1987 |
| JP | 01-158633 | 6/1989 |
| JP | 02-152029 | 6/1990 |
| JP | 04-086283 | 3/1992 |
| JP | 04-226785 | 8/1992 |
| JP | 06-171236 | 6/1994 |
| JP | 10-076755 | 3/1998 |
| JP | 10-143919 | 5/1998 |
| JP | 2000-187884 | 7/2000 |
| JP | 2001-423655 | 9/2001 |
| JP | 2002-104317 | 4/2002 |
| JP | 2002-120458 | 4/2002 |
| JP | 2002-269808 | 9/2002 |
| JP | 2003-054135 | 2/2003 |
| JP | 2003-085778 | 3/2003 |
| JP | 2003-302339 | 10/2003 |
| WO | 01/93256 | 12/2001 |

OTHER PUBLICATIONS

English Language Abstract of JP 2003-302339.
U.S. Appl. No. 10/896,051 to Inoue et al., which was filed Jul. 22, 2004.
U.S. Appl. No. 10/896,117 to Inoue et al., which was filed Jul. 22, 2004.
U.S. Appl. No. 10/923,665, to Inoue et al., which was filed Aug. 24, 2004.
U.S. Appl. No. 10/923,666, to Inoue et al., which was filed Aug. 24, 2004.
U.S. Appl. No. 10/923,673, to Inoue et al., which was filed Aug. 24, 2004.
U.S. Appl. No. 10/923,674, to Inoue et al., which was filed Aug. 24, 2004.
U.S. Appl. No. 10/923,679, to Inoue et al., which was filed Aug. 24, 2004.
U.S. Appl. No. 10/923,682, to Inoue et al., which was filed Aug. 24, 2004.
U.S. Appl. No. 10/923,699, to Inoue et al., which was filed Aug. 24, 2004.
English language Abstract of JP 57-22095.
English language Abstract of JP 57-27788.
English language Abstract of JP 58-220794.
English language Abstract of JP 60-160036.
K. Yoshii et al., "Investigation of Hole Formation on Cr/Al, Si/Al, and C/Al Bilayer Films by Laser Beam Irradiation," Journal of Applied Physics, 55(1):223-229, Jan. 1, 1984.
English language Abstract of JP 01-158633.
English language Abstract of JP 04-226785.
English language Abstract of JP 06-171236.
English language Abstract of JP 10-076755.
English language Abstract of JP 2001-423655.
English language Abstract of JP 2002-104317.
English language Abstract of JP 2002-269808.
English language Abstract of JP 2003-054135.
Inoue et al., "Inorganic Write Once Disc for High Speed Recording," Jpn. J. Appl. Phys., vol. 42, Part 1, No. 2B, pp. 1059-1061, (Feb. 2003).
English language Abstract of JP 2003-085778.
English language Abstract of JP 10-143919.
English language Abstract of JP 2000-187884.
English language Abstract of JP 2002-120458.
English language Abstract of JP 02-152029.
English language Abstract of JP 04-086283.
English language Abstract of CN 1330368.
English language Abstract of JP 59-225992.
English language Abstract of JP 62-225992.

* cited by examiner

F I G. 4
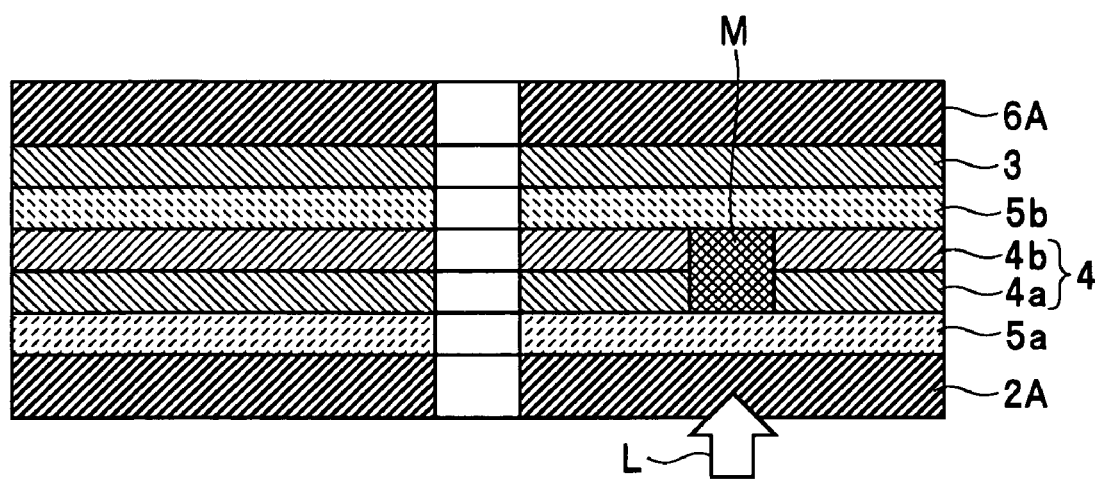

OPTICAL INFORMATION RECORDING MEDIUM

BACKGROUND OF THE INVENTION

1. Field of the Invention

The present invention relates to an optical information recording medium configured to be capable of recording and reproducing record data by irradiating a laser beam to a recording layer formed on a substrate.

2. Description of the Related Art

As an optical information recording medium of this kind, a write-once optical information recording medium has been conventionally proposed which includes a recording layer formed of an organic dye-based material and has the optical characteristics of the recording layer changed as a laser beam is irradiated thereon. Meanwhile, in recent years, optical information recording media are desired to have the capability of recording and reproducing a large amount of record data at a high speed (in a short time period) Accordingly, the optical information recording medium of the above-mentioned kind is required to enhance recording density of record data, and to meet the requirement, the diameter of a beam spot of a laser beam used for recording or reproduction of record data tends to be reduced. More specifically, record data are recorded and reproduced using a pickup which is equipped with an objective lens having a numerical aperture (NA) of not less than 0.7 (e.g. a numerical aperture (NA) of approximately 0.85), and is capable of emitting a laser beam having a wavelength ($\lambda$) of not more than 450 nm (e.g. a wavelength ($\lambda$) of approximately 405 nm). However, when a recording layer is formed by an organic dye-based material, it is difficult to change the optical characteristics of the recording layer using a laser beam with a wavelength of 405 nm or so. Therefore, the optical information recording medium including a recording layer formed of an organic dye-based material suffers from a problem that it has difficulty in performing high-density recording for enabling a large amount of record data to be recorded and reproduced at a high speed.

On the other hand, an optical disk is disclosed in Japanese Laid-Open Patent Publication No. S62-204442, which includes a recording layer capable of recording record data thereon by a phase change to a crystalline state or an amorphous state which is caused by irradiation of a laser beam thereon. This optical disk is comprised of a protective film, a recording layer, a protective film, and a protective film, sequentially deposited on a substrate in the mentioned order. In this case, the protective films deposited in a manner sandwiching the recording layer are provided for preventing the recording layer from flying off or being bored during irradiation of the laser beam (during recording of record data), and made of SiO, $SiO_2$, $SiN_3$, or the like. Further, the recording layer is formed by depositing two recording films formed of respective materials different from each other. More specifically, for example, one of the recording films is made of Si or Te, and the other is made of Au, Ag, or Ge.

For example, when the one of the recording films is made of Si, and the other is made of Au, both of the recording films are mixed with each other by being irradiated with the laser beam, whereby a single layer of AuSi is formed. In this case, to form the recording layer such that it is changed to a crystalline state or an amorphous state according to the irradiation power and irradiation time period of the laser beam, it is required that the atomic percentage of Si to the whole single layer of AuSi is within a range of 20 at % to 30 at %. Therefore, in the proposed optical disk, the recording films are formed by defining the ratio between the thickness of the one recording film and that of the other to be within a range of 2:8 to 3:7, whereby the atomic percentage of Si to the whole single layer of AuSi is caused to be within the above range. The uppermost protective film, which is the uppermost layer, prevents the other two protective films and the recording layer from being scratched, and is in the form of a thin film made of an ultraviolet-curing resin such that it covers the protective film immediately thereunder. Differently from an optical information recording medium having a recording film formed of an organic dye-based material, the above optical disk is capable of recording and reproducing record data using a laser beam having a relatively short wavelength. Therefore, with this optical disk, it is possible to perform high-density recording using a laser beam which is small in the diameter of a beam spot thereof.

However, as a result of the study of the above prior art, the present inventors have found the following problems: In the conventional optical disk, the recording layer is selectively changed to a crystalline state or an amorphous state by adjusting the irradiation power and irradiation time period of the laser beam, whereby the optical characteristics of the recording layer are changed. In this case, if the optical disk whose recording layer has been changed into a single layer of AuSi by being irradiated with the laser beam (i.e. which has record data recorded on the recording layer) is left standing for a long time period, the level of noise in a reproduction signal is progressively increased to decrease the C/N ratio of the reproduction signal, whereby it becomes difficult to normally reproduce the recorded data. Further, if the optical desk is left standing for a long time period, the reflectance of the recording layer exhibited with respect to the laser beam is decreased to decrease the C/N ratio of the reproduction signal. This makes it difficult to normally reproduce the recorded data. As described above, the conventional optical disk suffers from the problems of a large degree of deterioration caused by aging with respect to the noise level (hereinafter also referred to as "degree of noise-causing deterioration") and a large degradation ratio of reflectance of the laser beam L, which makes it difficult for the conventional optical disk to store record data for a long time period such that the record data can be normally reproduced during the long time period.

SUMMARY OF THE INVENTION

The present invention has been made to solve the problems described above, and a main object thereof is to provide an optical information recording medium which is capable of performing high-density recording of record data, and storing the recorded data for a long time period such that the recorded data can be normally reproduced during the long time period.

To attain the above object, the present invention provides an optical information recording medium for recording and reproducing record data, comprising a substrate, and a recording layer formed on the substrate, for having a laser beam irradiated thereto for recording and reproduction of the record data, the recording layer including a first recording film formed of a first material containing Si as a main component, and a second recording film formed of a second material containing Cu as a main component and having Si added thereto, the second recording film being formed in the vicinity of the first recording film. It should be noted that in the present invention, the term "main component" is intended to mean a component which has the largest composition ratio (at %: atomic percentage) of a plurality of elements constituting a material for forming a film or a layer.

With the arrangement of this optical information recording medium, a first recording film is formed by using the first material containing Si as a main component, and the second recording film is formed in the vicinity of the first recording film by using a second material containing Cu as a main component and having Si added thereto. The addition of Si makes it possible to reduce the degree of noise-causing deterioration (suppress a rise in the noise level due to aging), and greatly improve the degradation ratio of reflectance (suppress a decrease in reflectance). Consequently, it becomes possible to perform high-density recording of record data, and store the recorded data for a long time period such that the recorded data can be normally reproduced during the long time period. Further, the addition of Si makes it possible to improve the smoothness of the surface of the second recording film, thereby significantly lowering the noise level. Therefore, the C/N ratio can be enhanced, whereby record data can be reliably reproduced. Furthermore, a recorded portion (pit) can be positively formed in the recording layer even when a laser beam relatively small in power is irradiated.

Preferably, the second material has Si added thereto in an amount not less than 2 at % and not more than 45 at %. With this arrangement of the preferred embodiment, it is possible to decrease the degree of noise-causing deterioration to a level of 3.1 dB or lower, and reduce the degradation ratio of reflectance to a value of 17 % or less. This makes it possible to provide an optical information recording medium capable of reliably storing record data for a long time period.

More preferably, the second material has Si added thereto in an amount not less than 10 at % and not more than 35 at %. With this arrangement of the preferred embodiment, it is possible to decrease the degree of noise-causing deterioration to a level of 2.0 dB or lower, and reduce the degradation ratio of reflectance to a value of 11% or less. Therefore, an optical information recording medium can be provided which is capable of more reliably storing record data for a long time period.

Preferably, the recording layer is configured such that the first and second recording films are in contact with each other. With this arrangement of the preferred embodiment, when the laser beam adjusted to a recording power is irradiated to the recording layer, the first and second recording films can be easily mixed with each other to thereby form the recorded portion.

Preferably, the optical information recording medium includes a protective layer formed in a manner covering the recording layer. With this arrangement of the preferred embodiment, it is possible to positively prevent the first dielectric layer, the recording layer, and so forth, from being scratched. Further, since corrosion of the recording layer can be prevented, it is possible to store record data for a long time period such that the recorded data can be normally reproduced during the long time period.

More preferably, the protective layer is formed to be capable of transmitting the laser beam therethrough, the recording layer being formed by the second recording film and the first recording film, sequentially deposited on the substrate in the mentioned order, and the optical information recording medium is configured such that the record data can be recorded and reproduced by irradiation of the laser beam to the recording layer from a protective layer side. With this arrangement of the preferred embodiment, the protective layer can be formed to have a thickness less than that of the substrate, so that even when a pickup having an objective lens with a large numerical aperture (NA) is used, a sufficiently large tilt margin can be secured. Further, in the construction adapted to irradiation of the laser beam to the recording layer from the protective layer side, the present optical information recoding medium can more reliably form the recorded portion in the recording layer even with a laser beam relatively small in power, than an optical information recording medium in which the recording layer is formed by the first recording film and the second recording film, sequentially deposited on the substrate in the mentioned order.

Further preferably, the optical information recording medium includes a first dielectric layer formed between the recording layer and the protective layer, and a second dielectric layer formed between the substrate and the recording layer. With this arrangement of the preferred embodiment, it is possible to prevent thermal deformations of the substrate and the protective layer during irradiation of the laser beam (during formation of the recorded portion). As a result, it is possible to positively prevent a rise in the noise level caused by the thermal deformations.

Even more preferably, the optical information recording medium includes a reflective layer formed between the substrate and the second dielectric layer. With this arrangement of the preferred embodiment, since the effect of multi-beam interference is further increased, it is possible to further increase the difference in optical reflectance between the recorded portion and the unrecorded portion, whereby recorded data can be more reliably reproduced.

Preferably, the substrate is formed to be capable of transmitting the laser beam therethrough, the recording layer being formed by the first recording film and the second recording film, sequentially deposited on the substrate in the mentioned order, and the optical information recording medium is configured such that the record data can be recorded and reproduced by irradiation of the laser beam to the recording layer from a substrate side. With this arrangement of the preferred embodiment, since the second recording film is formed by using the material having Si added thereto, it is possible to reduce the degree of noise-causing deterioration (suppress a rise in the noise level due to aging), and greatly improve the degradation ratio of reflectance (suppress a decrease in reflectance). Consequently, it is possible to store record data for a long time period. In this case, in the construction adapted to irradiation of the laser beam to the recording layer from the substrate side, since the first recording film and the second recording film are sequentially deposited on the substrate in the mentioned order, the recorded portion can be more reliably formed in the recording layer even with a laser beam relatively small in power, than when the recording layer is formed by the second recording film and the first recording film, sequentially deposited on the substrate in the mentioned order.

More preferably, the optical information recording medium includes a protective layer formed in a manner covering the recording layer, a first dielectric layer formed between the substrate and the recording layer, and a second dielectric layer formed between the recording layer and the protective layer. The substrate is formed to be capable of transmitting the laser beam therethrough, the recording layer being formed by the first recording film and the second recording film, sequentially deposited on the substrate in the mentioned order, and the optical information recording medium is configured such that the record data can be recorded and reproduced by irradiation of the laser beam to the recording layer from a substrate side. With this arrangement of the preferred embodiment, it is possible to prevent thermal deformations of the substrate and the like during irradiation of the laser beam (during formation of the recorded portion). As a result, it is possible to positively prevent a rise in the noise level caused by the thermal deformations.

Further preferably, the optical information recording medium includes a reflective layer formed between the second dielectric layer and the protective layer. With this arrangement of the preferred embodiment, since the effect of multi-beam interference is further increased, it is possible to further increase the difference in optical reflectance between the recorded portion and the unrecorded portion, whereby record data can be more reliably reproduced.

It should be noted that the present disclosure relates to the subject matter included in Japanese Patent Application No. 2003-200198 filed on Jul. 23, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein:

FIG. 4 is a cross-sectional view showing the construction of an optical information recording medium according to another embodiment of the present invention.

DESCRIPTION OF THE PREFERRED EMBODIMENT

The invention will now be described in detail with reference to the accompanying drawings showing a preferred embodiment thereof.

First, a description will be given of the construction of an optical information recording medium 1 according to the present invention.

Figure 1:
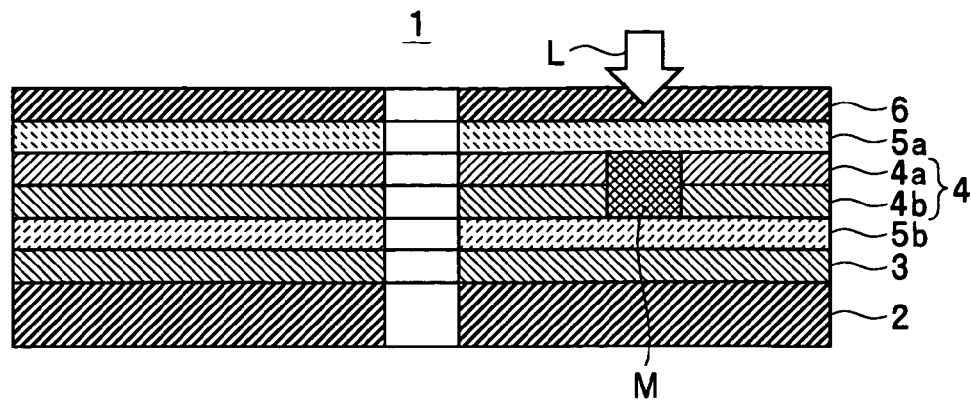
FIG. 1 is a cross-sectional view showing the construction of an optical information recording medium according to an embodiment of the present invention.

The optical information recording medium 1 is a single-sided single-layered optical disk of a write-once type, having an outer diameter of approximately 120 mm and a thickness of 1.2 mm, and configured to be capable of recording and reproducing record data, using a blue-violet laser beam (hereinafter referred to as the "laser beam") L having a wavelength ($\lambda$) not less than 380 nm and not more than 450 nm (e.g. 405 nm), emitted from an objective lens having a numerical aperture (NA) of not less than 0.7 (e.g. approximately 0.85). More specifically, as shown in FIG. 1, the optical information recording medium 1 is comprised of a reflective layer 3, a second dielectric layer 5b, a recording layer 4, a first dielectric layer 5a, and a light transmitting layer 6, sequentially deposited on a substrate 2 in the mentioned order. Further, the optical information recording medium 1 has a central portion thereof formed with a central hole for mounting (clamping) the same on a recording/reproducing apparatus.

The substrate 2 is in the form of a disk with a thickness of approximately 1.1 mm, made e.g. of a polycarbonate resin by the injection molding method. In this case, the substrate 2 can also be formed by any suitable one of various substrate-forming methods, such as the 2P method. Further, one surface (upper surface as viewed in FIG. 1) of the substrate 2 is formed with grooves and lands extending helically from a central portion of the substrate 2 toward the outer periphery thereof. In this case, the grooves and the lands function as guide tracks for recording and reproduction of data on and from the recording layer 4. Therefore, to enable accurate tracking to be performed, it is preferable to form grooves between the lands, for example, such that they have a depth not less than 10 nm and not more than 40 nm, and a pitch not less than 0.2 µm and not more than 0.4 µm. Further, the optical information recording medium 1 is configured such that the laser beam L is to be irradiated thereon from the light transmitting layer 6 side when data is recorded or reproduced. Therefore, the substrate 2 is not required to have a light transmitting property, i.e. be transparent, so that the optical information recording medium 1 has more options for selecting materials for forming the substrate 2 than the existing general optical information recording media (e.g. CD-R). More specifically, the material for forming the substrate 2 is not limited to the above-mentioned polycarbonate resin, but resin materials, such as an olefin resin, an acrylic resin, an epoxy resin, a polystyrene resin, a polyethylene resin, a polypropylene resin, a silicone resin, a fluorocarbon resin, an ABS resin, and an urethane resin, as well as glass and ceramic materials can be employed as the substrate-forming material. However, it is preferable to employ one of the resin materials that are easy to mold and relatively inexpensive, such as the polycarbonate resin and the olefin resin.

The reflective layer 3 reflects the laser beam L irradiated thereon via the light transmitting layer 6 when recorded data is reproduced, and is made of any of metal materials, such as Mg, Al, Ti, Cr, Fe, Co, Ni, Cu, Zn, Ge, Ag, Pt, and Au, or alloys containing selected ones of them (e.g. AgNdCu=98:1:1, and AgPdCu=98:1:1) such that it has a thickness not less than 10 nm and not more than 300 nm. In this case, to reflect the necessary and sufficient amount of the laser beam L, it is preferable to define the thickness of the reflective layer 3 to be not less than 20 nm and not more than 200 nm (e.g. 100 nm). Further, metal materials, such as, Al, Au, Ag, Cu, and the metal materials such as an alloy of Ag and Cu, have a high reflectance, and therefore it is preferable to use a metal material containing at least one of these metals as the material for forming the reflective layer 3.

The first dielectric layer 5a and the second dielectric layer 5b (also referred to as the "dielectric layers 5" when they are not distinguished from each other) correspond to first and second dielectric layers in the present invention, respectively, and are formed such that they sandwich the recording layer 4. The dielectric layers 5 prevent (reduce) corrosion of the recording layer 4, thereby preventing degradation of recorded data, and at the same time prevent thermal deformations of the substrate 2 and the light transmitting layer 6 during recording of record data to thereby prevent deterioration of jitter characteristics. Further, the dielectric layers 5 also serve to increase the amount of change in the optical characteristics between a recorded portion having record data recorded thereon (portion of the recording layer, having pits formed thereon) and an unrecorded portion having no record data recorded thereon (portion of the recording layer, having no pits formed thereon) by the effect of multi-beam interference. In this case, to increase the amount of change in the optical characteristics, it is preferable to form the dielectric layers 5 using a dielectric material having a high index of refraction (n) in the wavelength region of the laser beam L. Further, when the laser beam L is irradiated, if an excessively large amount of energy is absorbed by the dielectric layers 5, recording sensitivity of the recording layer 4 is reduced. Therefore, it is preferred to form the dielectric layers 5 using a dielectric material having a small extinction coefficient (k) in the wavelength region of the laser beam L to thereby prevent the reduction of the recording sensitivity.

More specifically, from the viewpoint of prevention of thermal deformations of the substrate 2 and the light transmitting layer 6, and enhancement of protecting characteristics of the dielectric layers 5 for protecting the recording layer 4 as well as obtaining the sufficient effect of multibeam interference, it is preferable to employ a dielectric material having a light transmitting property, such as any of $Al_2O_3$, AlN, ZnO, ZnS, GeN, GeCrN, $CeO_2$, SiO, $SiO_2$, $Si_3N_4$, SiC, $La_2O_3$, TaO, $TiO_2$, SiAlON (mixture of $SiO_2$, $Al_2O_3$, $Si_3N_4$, and AlN), and LaSiON (mixture of $La_2O_3$, $SiO_2$, and $Si_3N_4$), any of oxides, nitrides, sulfides, and carbides of Al, Si, Ce, Ti, Zn, and Ta, and mixtures thereof, as the dielectric material for forming the dielectric layers 5. In this case, the first dielectric layer 5a and the second dielectric layer 5b can be formed of the same dielectric material, or alternatively of respective dielectric materials different from each other. Further, one or both of the first dielectric layer 5a and the second dielectric layer 5b can be configured to have a multilayer structure formed by a plurality of dielectric layers.

In the optical information recording medium 1 according to the present invention, the first dielectric layer 5a and the second dielectric layer 5b are formed of a dielectric material mainly composed of a mixture of ZnS and $SiO_2$ (preferably, molar ratio of ZnS:$SiO_2$=80:20), such that they have a thickness not less than 10 nm and not more than 200 nm (e.g. 25 nm). In this case, the mixture of ZnS and $SiO_2$ has a high index of refraction (n), and a relatively small extinction coefficient (k) with respect to the laser beam L in the wavelength region ranging from 380 nm to 450 nm inclusive, which causes a more conspicuous change in optical characteristics of the recording layer 4 before and after recording of data thereon, and at the same time prevents the recording sensitivity of the same from being degraded. Further, the thickness of each of the first and second dielectric layers 5a and 5b is not limited to the examples described above, but when the dielectric layer has a thickness of less than 10 nm, it is difficult to obtain the aforementioned effects. Inversely, when the dielectric layer has a thickness of more than 200 nm, it takes a long time to deposit the dielectric layer, which can sharply increase the manufacturing costs of the optical information recording medium 1, and further cause cracks in the optical information recording medium 1 due to stress within the first dielectric layer 5a or the second dielectric layer 5b. Therefore, it is preferable to define the thicknesses of the first and second dielectric layers 5a and 5b to be not less than 10 nm and not more than 200 nm.

The recording layer 4 has optical characteristics thereof changed by the laser beam L irradiated thereto during recording of record data so as to be formed with recorded portions M (pits). The recording layer 4 is formed by two thin films, i.e. a second sub-recording film 4b and a first sub-recording film 4a, sequentially deposited on the substrate 2 in the mentioned order. In this case, the recording layer 4 is formed such that the two thin films are deposited in the order of the first sub-recording film 4a and the second sub-recording film 4b from the light transmitting layer 6 side (side closer to the incidence plane of the laser beam L). This enables the optical characteristics of the recording layer 4 to be sufficiently changed even with a laser beam L relatively small in power, thereby making it possible to reliably form the recorded portions M. The first sub-recording film 4a corresponds to a first recording film according to the present invention, and is in the form of a thin film made of a material (first material in the present invention) containing Si as the main component. By forming the first sub-recording film 4a using the material containing Si as the main component, it is possible to fully enhance the C/N ratio of a reproduction signal, as will be described hereinafter. In the embodiment of the present invention, the atomic percentage of Si to the whole material for forming the first sub-recording film 4a is defined to be not lower than 95 at % (e.g. 99 at %).

Further, the second sub-recording film 4b corresponds to a second recording film according to the present invention, and is in the form of a thin film made of a material (second material in the present invention) containing Cu as a main component and having Si added thereto. In this case, by forming the second sub-recording film 4b using a material containing Cu as a main component, Cu as the main component of the second sub-recording film 4b and Si as the main component of the first sub-recording film 4a are rapidly mixed with each other when the laser beam L is irradiated during recording of record data. This makes it possible to promptly form recorded portions M (promptly record data). Further, the second sub-recording film 4b is deposited by using a material containing Cu as the main component, by the vapor phase growth method, such as the vacuum deposition method and the sputtering method, thereby making it possible to improve the smoothness of the upper surface of the second sub-recording film 4b. Furthermore, since Cu is a very inexpensive material, it is possible to fully reduce the manufacturing costs of the optical information recording medium 1.

In this case, when the second sub-recording film 4b is formed of a material obtained by adding Si to Cu, the smoothness of the upper surface of the second sub-recording film 4b can be further increased compared with that of the upper surface of the second sub-recording film 4b formed of a material made of only Cu (having no Si added thereto). This makes it possible to decrease the noise level of the reproduction signal to increase the C/N ratio. Further, by forming the second sub-recording film 4b using the material obtained by adding Si to Cu, it is possible to fully improve the recording sensitivity of the recording layer and suppress deterioration of the reflectance, which makes it possible to store record data for a long time period. Additionally, since both Cu and Si are pollution-free materials, it is possible to minimize impact on a terrestrial environment, e.g. even if used optical information recording media 1 are buried in the earth for disposal. In this case, it is preferred to use a material having Si added in an amount not less than 1 at % and less than 50 at %, as the material for forming the second sub-recording film 4b. Further, to decrease the degree of noise-causing deterioration of the medium 1 and reduce the degradation ratio of reflectance of the second sub-recording film 4b, it is preferred to use a material having Si added in an amount not less than 2 at % and not more than 45 at %. Moreover, to further decrease the degree of noise-causing deterioration of the medium 1 and further reduce the degradation ratio of reflectance of the second sub-recording film 4b, it is preferred to use a material having Si added in an amount not less than 10 at % and not more than 35 at %. In the embodiment of the present invention, for example, the atomic percentage of Cu to the whole material for forming the second sub-recording film 4b is defined to be 80 at %, and that of Si, which is added, to the same is defined to be 20 at %.

As the thickness of the first sub-recording film 4a and that of the second sub-recording film 4b (the total thickness of the recording layer 4) are increased, the smoothness of the upper surface of the first sub-recording film 4a located closer to the incidence plane of the laser beam L is reduced to cause an increase in the noise level of the reproduction signal and degrade the recording sensitivity of the recording layer 4. In this case, when the thickness of the recording layer 4 exceeds 50 nm, the recording sensitivity thereof is so reduced that it can be difficult to use the medium 1 as the optical information recording medium. Meanwhile, when the total thickness of the recording layer 4 is less than 2 nm, the amount of change in optical characteristics of the recording layer 4 before and after recording of data thereon is decreased to decrease the C/N ratio, which makes it difficult to normally reproduce recorded data. Therefore, preferably, the total thickness of the recording layer 4 is defined to be not less than 2 nm and not more than 50 nm, and more preferably, it is defined to be not less than 2 nm and not more than 30 nm. In this case, to decrease the level of noise contained in the reproduction signal, the degree of noise-causing deterioration of the medium 1, and the degradation ratio of reflectance, it is preferable to form the sub-recording films 4a and 4b such that the total thickness of the recording layer 4 is not less than 5 nm and not more than 15 nm.

Although the respective thicknesses of the sub-recording films 4a and 4b are not particularly limited, to fully improve the recording sensitivity of the recording layer 4, and at the same time sufficiently change the optical characteristics of the recording layer 4 before and after recording of data thereon, it is preferable to form the sub-recording films 4a and 4b such that each of them has a thickness not less than 2 nm and not more than 30 nm. Further, to more sufficiently change the optical characteristics of the recording layer 4 before and after recording of data thereon, it is preferable to define the respective thicknesses of the sub-recording films 4a and 4b such that the ratio between the thickness of the first sub-recording film 4a and that of the second sub-recording film 4b (thickness of the first sub-recording film 4a/thickness of the second sub-recording film 4b) is not less than 0.2 and not more than 5.0. In the embodiment of the present invention, the recording layer 4 is formed, for example, such that the total thickness thereof becomes equal to 10 nm by defining the thickness of the first sub-recording film 4a to be 5 nm, and that of the second sub-recording film 4b to be 5 nm.

The light transmitting layer 6, which corresponds to a protective layer in the present invention, functions as an optical path of the laser beam when data is recorded or reproduced, and at the same time physically protects the recording layer 4 and the first dielectric layer 5a. The light transmitting layer 6 is formed of a resin material, such as a ultraviolet-curing resin or an electron beam-curing resin, such that it has a thickness not less than 1 μm and not more than 200 μm (preferably, not less than 50 μm and not more than 150 μm: e.g. 100 μm) In this case, when the light transmitting layer 6 has a thickness of less than 1 μm, it becomes difficult to protect the recording layer 4 and the first dielectric layer 5a, whereas when the light transmitting layer 6 has a thickness of more than 200 μm, it becomes difficult to form a light transmitting layer 6 whose parts (particularly, parts in the radial direction) have a uniform thickness. Further, when the thick light transmitting layer 6 is formed of a material different from the material for forming the substrate 2, warpage of the optical information recording medium 1 can be caused by thermal expansion, thermal shrinkage, or the like thereof. It should be noted that the method of forming the light transmitting layer 6 includes a method of applying a resin material (on the first dielectric layer 5a) by the spin coating method or the like, and then curing the same, a method of affixing a sheet material formed of a light-transmitting resin to the first dielectric layer 5a by an adhesive or the like. However, to prevent attenuation of the laser beam L, it is preferable to employ the spin coating method which does not add the adhesive layer in the medium 1.

When the optical information recording medium 1 is manufactured, first, a stamper for molding a substrate is set in a mold mounted to an injection molder. Then, the temperature of a polycarbonate resin, and the temperature of the mold are set to approximately 360 degree Celsius and approximately 120 degree Celsius, respectively, and at the same time, other molding conditions, such as a clamping force, a cooling time period, and the like, are set. The substrate 2 is formed by injection molding under these conditions. Then, the reflective layer 3 having a thickness of approximately 100 nm is formed on the upper surface of the substrate 2 by the vapor phase growth method (the vacuum deposition method, the sputtering method, or the like: in the present case, e.g. the sputtering method) using chemical species containing Ag as a main component. Next, the second dielectric layer 5b having a thickness of approximately 25 nm is formed by the vapor phase growth method using chemical species mainly composed of a mixture of ZnS and SiO$_2$ in a manner covering the reflective layer 3. Then, the second sub-recording film 4b having a thickness of approximately 5 nm is formed by the vapor phase growth method using a material (chemical species) containing Cu as a main component and having Si added thereto, in a manner covering the second dielectric layer 5b. Since the second sub-recording film 4b is formed by using the material obtained by adding Si to the main component of Cu which is capable of ensuring the smoothness of the upper surface of the second sub-recording film 4b by itself, the upper surface of the second sub-recording film 4b is made even flatter or smoother (the smoothness of the upper surface of the second sub-recording film 4b is ensured), compared with a case where a material having no Si added thereto is used.

Then, the first sub-recording film 4a having a thickness of approximately 5 nm is formed by the vapor phase growth method using a material (chemical species) containing Si as a main component in a manner covering the second sub-recording film 4b. In forming the first sub-recording film 4a, since the upper surface of the second sub-recording film 4b has been formed flat, the upper surface of the first sub-recording film 4a is also formed flat similarly to the upper surface of the second sub-recording film 4b. After that, the first dielectric layer 5a having a thickness of approximately 25 nm is formed by the vapor phase growth method using chemical species mainly composed of a mixture of ZnS and SiO$_2$, in a manner covering the first sub-recording film 4a. It should be noted that it is preferable to form the reflective layer 3, the second dielectric layer 5b, the second sub-recording film 4b, the first sub-recording film 4a, and the first dielectric layer 5a, successively on the substrate 2 by using a sputtering machine having a plurality of sputtering chambers, by adjusting layer-forming conditions on a chamber-by-chamber basis as required. Subsequently, the light transmitting layer 6 having a thickness of approximately 100 μm is formed on the first dielectric layer 5a by applying e.g. an acrylic-based ultraviolet-curing resin (or an epoxy-based ultraviolet-curing resin) in a manner covering the first dielectric layer 5a by the spin coating method, and then curing the same. In forming the light transmitting layer 6, conditions for spin coating (rotational speed, rate of change in the speed, a time period taken until the rotation is stopped, etc.) are adjusted, as required, so as to form the layer 6 such that it has a uniform thickness (particularly, in the radial direction). Further, to form a light transmitting layer 6 having a thickness of approximately 100 µm, it is preferable to use a resin material (ultraviolet-curing resin, in the present case) whose viscosity is high to some extent. Thus, the optical information recording medium 1 is completed.

Next, the principles of recording of record data by the optical information recording medium 1 will be described with reference to drawings.

First, the laser beam L adjusted to a recording power (e.g. of approximately 5.0 mW at the upper surface of the light transmitting layer 6), having a wavelength (λ) of 405 nm, is emitted from an objective lens having a numerical aperture (NA) of 0.85, and irradiated onto the optical information recording medium 1. At this time, in an area of the recording layer 4 to which the laser beam L is irradiated, an element (Si, in the present case), which is the main component of the first sub-recording film 4a, and an element (Cu, in the present case), which is the main component of the second sub-recording film 4b, are mixed with each other, to form a recorded portion M shown in FIG. 1. In this case, portions remaining in the state of the first sub-recording film 4a and the second sub-recording film 4b being layered (hereinafter also referred to as the "layered portions" or "unrecorded portions"), and the recorded portions M are largely different in optical characteristics. Hence, when the laser beam L adjusted to a reproduction power is irradiated to the layered portion and the recorded portion M, respective values of reflectance exhibited by the two kinds of portions are very different from each other. Therefore, by detecting the difference in the reflectance, it is determined whether or not each recorded portion M exists, and based on the determination, the recording/reproducing apparatus reproduces (reads) record data.

In this case, in the optical information recording medium 1, since the second sub-recording film 4b is formed of a material containing Cu as a main component and having Si added thereto, the smoothness of the upper surface of the second sub-recording film 4b is improved compared with a second sub-recording film 4b made of a material having no Si added thereto, and hence even if the diameter of a beam spot of the laser beam L is made very small, it is possible to positively form the recorded portion M. Further, since the smoothness of the upper surface of the second sub-recording film 4b is improved by addition of Si, the noise level of the reproduction signal is prevented from rising. Furthermore, since the second sub-recording film 4b and the first sub-recording film 4a are sequentially formed on the substrate 2 in the mentioned order, Cu (the second sub-recording film 4b formed of the material containing Cu as the main component) having a higher optical reflectance is located on the far side in the direction of irradiation of the laser beam L, so that the recorded portion M can be more reliably formed in the recording layer 4 even with the laser beam L small in power, than when the recording layer 4 is formed by the first sub-recording film 4a and the second sub-recording film 4b, sequentially deposited on the substrate 2 in the mentioned order.

Further, the recording layer 4 is sandwiched by the first dielectric layer 5a and the second dielectric layer 5b, and hence even when the first sub-recording film 4a and the second sub-recording film 4b are heated by the irradiation of the laser beam L to the extent that they are mixed with each other, it is possible to prevent thermal deformations of the substrate 2 and the light transmitting layer 6. This makes it possible to prevent a rise in the noise level, a decrease in the C/N ratio, and deterioration of jitter characteristics. Furthermore, since the first sub-recording film 4a is made of a material containing Si as a main component, and the second sub-recording film 4b is made of a material containing Cu as a main component, it is possible to sufficiently change the optical characteristics of a portion of the recording layer 4, which is formed into the recorded portion M, before and after recording of record data thereon. As a result, it can be positively detected whether or not the recorded portion M exists, thereby making it possible to reliably reproduce record data.

Next, the relationship between the amount of Si added to a material (material containing Cu as a main component) for forming the second sub-recording film 4b, and the degree of noise-causing deterioration and the degradation ratio of reflectance will be described with reference to FIGS. 2 and 3.

As described hereinbefore, if Si is added to the material (material containing Cu as the main component) for forming the second sub-recording film 4b, it is possible to improve the smoothness of the upper surface of the second sub-recording film 4b formed by the vapor phase growth method. Therefore, it is possible to decrease the level of noise contained in the reproduction signal (noise level of the reproduction signal). In this case, the present inventors have confirmed that the noise level at least in a frequency band of 4.1 MHz to 16.5 MHz is reduced by addition of Si. Further, the degree of noise-causing deterioration can be decreased by adding Si to the material used for forming the second sub-recording film 4b, thereby making it possible to store record data for a long time period. More specifically, the optical information recording medium 1 was left standing e.g. for 50 hours in an environment of 80 degree Celsius and 85% RH, while measuring the noise level before and after causing the medium 1 to be left standing (for example, the noise level in the vicinity of 4.2 MHz was measured, while rotating the optical information recording medium 1 at a linear velocity of 5.3 m/s). Based on the results of the measurement, the degree of noise-causing deterioration was calculated.

Figure 2:
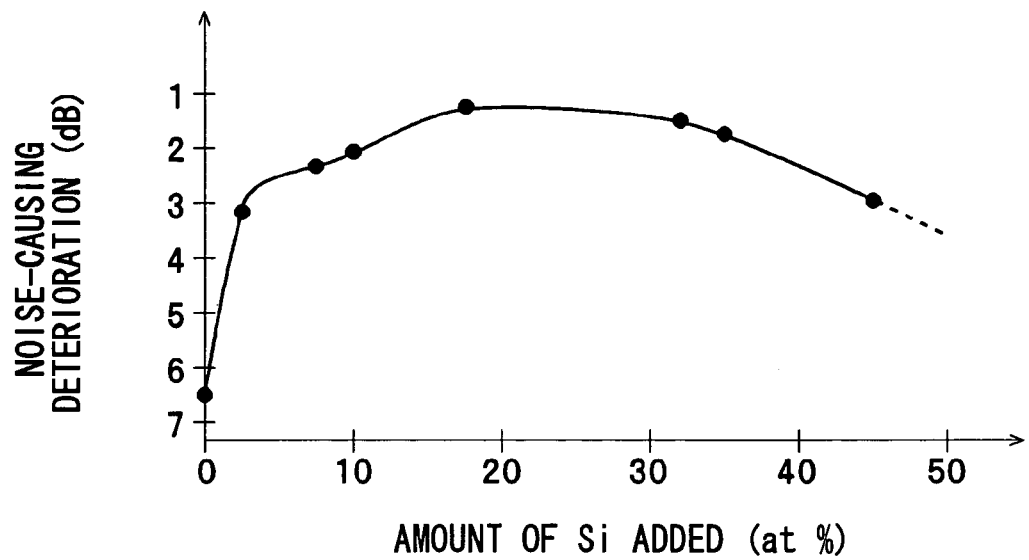
FIG. 2 is a characteristics diagram showing the relationship between the amount of Si added to a material for forming a second sub-recording film, and the degree of noise-causing deterioration.
Figure 3:
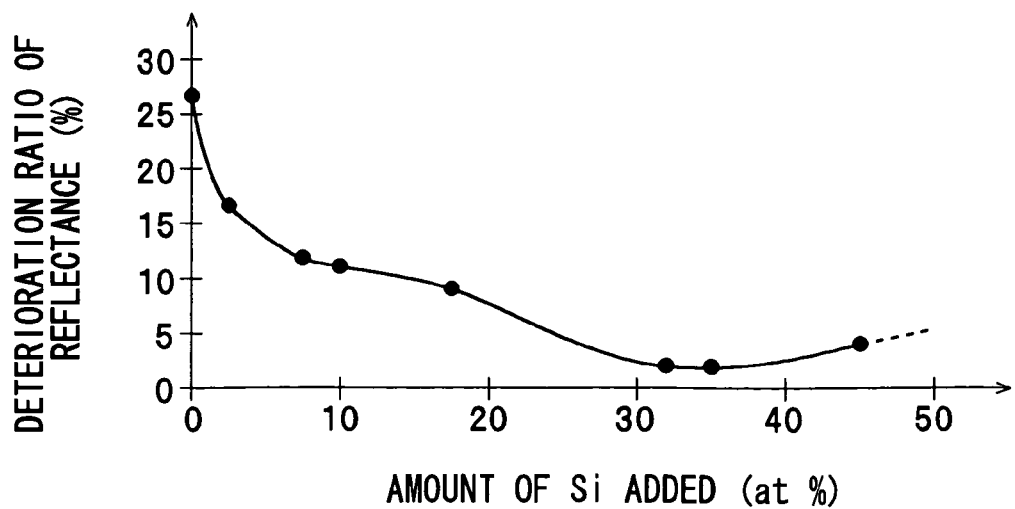
FIG. 3 is a characteristics diagram showing the relationship between the amount of Si added to a material for forming the second sub-recording film, and the degradation ratio of reflectance.

In this case, as shown in FIG. 2, when Si is not added to the material for forming the second sub-recording film 4b, which contains Cu as the main component (when Si is added in an amount of 0 at %), the degree of noise-causing deterioration is 6.5 dB, whereas when Si is added to the material containing Cu as the main component in an amount of 2 at %, the degree of noise-causing deterioration is decreased to 3.1 dB. Furthermore, when Si is added in amounts of 7 at %, 10 at %, 18 at %, 32 at %, 35 at %, and 45 at %, the respective degrees of noise-causing deterioration is lowered to 2.3 dB, 2.0 dB, 1.4 dB, 1.5 dB, 1.6 dB, and 3.0 dB. Therefore, by adding Si to a material containing Cu as the main component in an amount not less than 2 at % and not more than 45 at %, it is possible to reduce the degree of noise-causing deterioration to a level of 3.1 dB or lower.

Further, the present inventors have confirmed that the degradation ratio of reflectance is decreased by adding Si to a material containing Cu as a main component. More specifically, the optical information recording medium 1 was left standing e.g. for 50 hours in the environment of 80 degree Celsius and 85% RH, and the degree of degradation of reflectance (degradation ratio: [reflectance before the medium 1 was left standing—reflectance after the medium 1 was left standing]/reflectance before the medium 1 was left standing) was measured before and after the medium 1 was left standing. In this case, as shown in FIG. 3, when Si is not added to a material for forming the second sub-recording film 4b, which contains Cu as the main component, the degradation ratio is 27%, whereas when Si is added to the material containing Cu as the main component in an amount of 2 at %, the degradation ratio is decreased to 17%. Furthermore, when Si is added in amounts of 7 at %, 10 at %, 18 at %, 32 at %, 35 at %, and 45 at %, the degradation ratio of reflectance is lowered to 12%, 11%, 9%, 2%, 2%, and 4%. Therefore, by adding Si to a material containing Cu as the main component in an amount not less than 2 at % and not more than 45 at %, it is possible to suppress the degradation of reflectance, thereby making it possible to store record data for a long time period.

In the above examples, the reason for larger values of the degree of noise-causing deterioration exhibited when no Si was added is presumably due to significant corrosion of Cu contained in the second sub-recording film 4b as the main component. Therefore, by forming the second sub-recording film 4b using the material containing Cu as the main component and having Si added in an amount not less than 2 at % and not more than 45 at %, it is possible to manufacture the optical information recording medium 1 capable of normally reproducing recorded data (reducing the noise level), and storing the record data for a long time period (decreasing the degree of noise-causing deterioration and the degradation ratio of reflectance) Furthermore, if the amount of Si added is defined to be not less than 10 at % and not more than 35 at %, it is possible to further decrease the degree of noise-causing deterioration, and at the same time more positively prevent the degradation of reflectance, thereby making it possible to realize reliable storage of record data for a long time period.

Next, a description will be given of the relationship between the thickness (layer thickness) of the recording layer 4 and the C/N ratio.

As describe above, by reducing the layer thickness of the recording layer 4 (the sum of the thickness of the first sub-recording film 4a and the thickness of the second sub-recording film 4b), it is possible to enhance the smoothness of the upper surfaces of the first and second sub-recording films 4a and 4b, thereby making it possible to increase the C/N ratio. However, when the layer thickness of the recording layer 4 is too small, the amount of change in optical characteristics of the recording layer 4 before and after recording of data thereon becomes too small, causing a reduced C/N ratio. This makes it difficult to normally reproduce record data. On the other hand, when the layer thickness of the recording layer 4 is too large, a crack can be produced in the optical information recording medium 1 due to stress within the first and second sub-recording films 4a and 4b, and the smoothness of the upper surfaces of the first and second sub-recording films 4a and 4b is reduced to increase the noise level, which results in the reduced C/N ratio. Further, when the layer thickness of the recording layer 4 is too large, the recording sensitivity of the recording layer 4 can be lowered. Therefore, it is required to define the layer thickness of the recording layer 4 in view of such circumstances.

More specifically, when the layer thickness of the recording layer 4 is less than 2 nm, or when the layer thickness thereof is more than 40 nm, the C/N ratio is excessively decreased to make it difficult to normally reproduce record data. On the other hand, when the layer thickness of the recording layer 4 is not less than 5 nm and not more than 20 nm, the C/N ratio becomes a relatively large value, which makes it possible to perform reliable reproduction of record data. In this case, when the layer thickness of the recording layer 4 is less than 2 nm, the optical characteristics of the recording layer 4 are hardly changed between before and after recording of data on the recording layer 4, so that the C/N ratio is decreased. Further, when the layer thickness of the recording layer 4 is more than 40 nm, the smoothness of the upper surfaces of the first and second sub-recording films 4a and 4b is reduced, resulting in the increased noise level, and the reduced C/N ratio. Furthermore, when the layer thickness of the recording layer 4 is more than 40 nm, a crack is produced in the recording layer 4 due to the stresses within the first and second sub-recording films 4a and 4b, when the optical information recording medium 1 is heated or cooled, or when a force for bending the medium 1 is applied to the medium 1. Additionally, it has also been confirmed that when the layer thickness of the recording layer 4 is more than 40 nm, the recording sensitivity of the recording layer 4 is reduced. Therefore, to reliably reproduce record data while preventing production of a crack and reduction of the recording sensitivity, it is preferable to form the first sub-recording film 4a and the second sub-recording film 4b such that the layer thickness of the recording layer 4 is not less than 2 nm and not more than 40 nm. Further, to more reliably reproduce record data, it is preferable to form the first sub-recording film 4a and the second sub-recording film 4b such that the layer thickness of the recording layer 4 is not less than 5 nm and not more than 20 nm.

As described hereinabove, according to the optical information recording medium 1, the first sub-recording film 4a is formed by using a first material containing Si as a main component, and the second sub-recording film 4b is formed in the vicinity of the first sub-recording film 4a by using a second material containing Cu as a main component and having Si added thereto. The addition of Si makes it possible to reduce the degree of noise-causing deterioration (suppress a rise in the noise level due to aging), and greatly improve the degradation ratio of reflectance (suppress a decrease in reflectance). Consequently, it is possible to perform high-density recording of record data, and store the recorded data for a long time period such that the recorded data can be normally reproduced during the long time period. Further, the addition of Si makes it possible to improve the smoothness of the upper surface of the second sub-recording film 4b, thereby significantly lowering the noise level. Therefore, the C/N ratio can be enhanced, whereby record data can be reliably reproduced. Furthermore, the recorded portion M can be positively formed in the recording layer 4 even when the laser beam L small in power is irradiated.

According to the optical information recording medium 1, the second sub-recording film 4b is formed by using the second material having Si added thereto in an amount not less than 2 at % and not more than 45 at %, whereby it is possible to decrease the degree of noise-causing deterioration to a level 3.1 dB or lower, and reduce the degradation ratio of reflectance to a value of 17% or less. This makes it possible to provide the optical information recording medium 1 capable of reliably storing record data for a long time period.

Furthermore, according to the optical information recording medium 1, if the second sub-recording film 4b is formed by using the second material having Si added thereto in an amount not less than 10 at % and not more than 35 at %, it is possible to decrease the degree of noise-causing deterioration to a level of 2.0 dB or lower, and reduce the degradation ratio of reflectance to a value 11% or less. This makes it possible to provide the optical information recording medium 1 capable of more reliably storing record data for a long time period.

Further, according to the optical information recording medium 1, the recording layer 4 is constructed by forming the first sub-recording film 4a and the second sub-recording film 4b such that they are in contact with each other, whereby when the laser beam L adjusted to the recording power is irradiated to the recording layer, the first sub-recording film 4a and the second sub-recording film 4b can be easily mixed with each other to thereby form the recorded portion M.

Still further, according to the optical information recording medium 1, the light transmitting layer 6 is formed in a manner covering the recording layer 4, whereby it is possible to positively prevent the first dielectric layer 5a, the recording layer 4, and so forth, from being scratched.

Further, according to the optical information recording medium 1, the recording layer 4 is formed by the second sub-recording film 4b and the first sub-recording film 4a, sequentially deposited on the substrate 2 in the mentioned order, such that record data can be recorded and reproduced by irradiation of the laser beam L to the recording layer 4 from the light transmitting layer 6 side. Therefore, the light transmitting layer 6 can be formed to have a thickness less than that of the substrate 2, so that even when a pickup having an objective lens with a large numerical aperture (NA) is used, a sufficiently large tilt margin can be secured. Further, in the construction adapted to irradiation of the laser beam L to the recording layer 4 from the light transmitting layer side, the present optical information recoding medium can more reliably form the recorded portion M in the recording layer 4 even with the laser beam L relatively small in power, than an optical information recording medium in which the recording layer 4 is formed by the first sub-recording film 4a and the second sub-recording film 4b, sequentially deposited on the substrate 2 in the mentioned order.

Furthermore, according to the optical information recording medium 1, the first dielectric layer 5a is formed between the recording layer 4 and the light transmitting layer 6, and the second dielectric layer 5b is formed between the substrate 2 and the recording layer 4, whereby it is possible to prevent thermal deformations of the substrate 2 and the light transmitting layer 6 during irradiation of the laser beam L (during formation of the recorded portion M). As a result, it is possible to positively prevent a rise in the noise level caused by the thermal deformations. Further, since corrosion of the recording layer 4 can be prevented, it is possible to store recorded data for a long time period such that the recorded data can be normally reproduced during the long time period.

Furthermore, according to the optical information recording medium 1, the reflective layer 3 is formed between the substrate 2 and the second dielectric layer 5b, whereby the effect of multi-beam interference is further increased. This makes it possible to further increase the difference in optical reflectance between the recorded portion M and the unrecorded portion, whereby it is possible to more reliably reproduce record data.

Next, an optical information recording medium 1A according to another embodiment of the present invention will be described with reference to FIG. 4. It should be noted that in the following description, the component parts and elements identical to those of the aforementioned optical information recording medium 1 are designated by identical reference numerals, and duplicate description thereof is omitted.

As shown in FIG. 4, the optical information recording medium 1A is comprised of a first dielectric layer 5a, a recording layer 4, a second dielectric layer 5b, a reflective layer 3, and a protective layer 6A, sequentially deposited on the substrate 2A in the mentioned order. In this case, the optical information recording medium 1A is configured such that record data can be recorded and reproduced by irradiation of a laser beam L to the recording layer 4 from the substrate side. Therefore, the substrate 2A is made of a resin material having a light transmitting property (e.g. a polycarbonate resin) by the injection molding method such that it has a thickness not less than 0.5 mm and not more than 1.3 mm (e.g. approximately 0.6 mm), and that the laser beam L can be transmitted therethrough. It should be noted that the material for forming the substrate 2A is only required to be capable of transmitting the laser beam L.

The recording layer 4 is comprised of a first sub-recording film 4a (first recording film) and a second sub-recording film 4b (second recording film), sequentially deposited on the first dielectric layer 5a in the mentioned order. It should be noted that materials for forming the first sub-recording film 4a and the second sub-recording film 4b, methods for forming them, thicknesses thereof are similar to those described in detail hereinabove with respect to the first sub-recording film 4a and the second sub-recording film 4b of the optical information recording medium 1, and description thereof is omitted. The protective layer 6A prevents the recording layer 4, the second dielectric layer 5b, and so forth, from being scratched, and is formed e.g. of a resin material, such as an ultraviolet-curing resin or an electron beam-curing resin, such that it has a thickness not less than 1 µm and not more than 100 µm (e.g. approximately 7 µm). In this case, when the protective layer 6A has a thickness of less than 1 µm, it becomes difficult to protect the recording layer 4 and the second dielectric layer 5b, whereas when the light transmitting layer 6 has a thickness of more than 100 µm, it becomes difficult to form the protective layer 6A such that it is uniform in thickness. To form the protective layer 6A, there can be employed a method of applying a resin material by the spin coating method or the like, and then curing the same.

Similarly to the optical information recording medium 1 described hereinabove, in the optical information recording medium 1A, when the laser beam L adjusted to a recording power is irradiated to the recording layer 4, an element (Si, in the present case), which is the main component of the first sub-recording film 4a, and an element (Cu, in the present case), which is the main component of the second sub-recording film 4b, are mixed with each other, and as shown in FIG. 4, to form a recorded portion M. In this case, in the optical information recording medium 1A, Si is added to a material (material containing Cu as a main component) used for forming the second sub-recording film 4b, and hence the degree of noise-causing deterioration and the degradation ratio of reflectance are decreased compared with a case in which the second sub-recording film 4b is formed by using a material having no Si added thereto.

Further, since the first sub-recording film 4a and the second sub-recording film 4b are sequentially deposited on the substrate 2A in the mentioned order, the recorded portion M is more reliably formed (record data is more reliably recorded) in the recording layer 4 even with the laser beam L relatively small in power, than when the recording layer 4 is formed by the second sub-recording film 4b and the first sub-recording film 4a, sequentially deposited on the substrate 2A in the mentioned order. Furthermore, the recording layer 4 is sandwiched by the first dielectric layer 5a and the second dielectric layer 5b, and hence even when the first sub-recording film 4a and the second sub-recording film 4b are heated by the irradiation of the laser beam L to such an extent that they are mixed with each other, it is possible to prevent thermal deformations of the substrate 2 and the like. This makes it possible to prevent a rise in the noise level, a decrease in the C/N ratio, and deterioration of jitter characteristics.

As described above, according to the optical information recording medium 1A, the recording layer 4 is formed by the first sub-recording film 4a and the second sub-recording film 4b, sequentially deposited on the substrate 2A in the mentioned order, such that record data can be recorded and reproduced by irradiation of the laser beam L to the recording layer 4 from the substrate side. Since the second sub-recording film 4b is formed by using a material having Si added thereto, it is possible to reduce the degree of noise-causing deterioration (suppress a rise in the noise level due to aging), and greatly improve the degradation ratio of reflectance (suppress a decrease in reflectance). Consequently, it is possible to perform high-density recording of record data, and store the recorded data for a long time period such that the recorded data can be normally reproduced during the long time period. In this case, in the construction adapted to irradiation of the laser beam L to the recording layer 4 from the substrate side, the first sub-recording film 4a and the second sub-recording film 4b are sequentially deposited on the substrate 2A in the mentioned order, so that the recorded portion M can be more reliably formed in the recording layer 4 even with the laser beam L relatively small in power, than when the recording layer 4 is formed by the second sub-recording film 4b and the first sub-recording film 4a, sequentially deposited on the substrate 2A in the mentioned order.

Further, according to the optical information recording medium 1A, the first dielectric layer 5a is formed between the substrate 2A and the recording layer 4, and the second dielectric layer 5b is formed between the recording layer 4 and the protective layer 6A, whereby it is possible to prevent thermal deformations of the substrate 2A and the like during irradiation of the laser beam L (during formation of the recorded portion M). As a result, it is possible to positively prevent a rise in the noise level caused by the thermal deformations. Further, since corrosion of the recording layer 4 can be prevented, it is possible to store recorded data for a long time period in a manner such that the data can be normally reproduced.

Furthermore, according to the optical information recording medium 1A, the reflective layer 3 is formed between the second dielectric layer 5b and the protective layer 6A, whereby the effect of multi-beam interference is further increased. This makes it possible to further increase the difference in optical reflectance between the recorded portion M and an unrecorded portion, whereby it is possible to more reliably reproduce record data.

It should be noted that the present invention is by no means limited to the aforementioned embodiments. For example, although in the above-described embodiments, the description has been given of the examples in which the first sub-recording film 4a and the second sub-recording film 4b are arranged adjacent to each other in the direction of thickness of the optical information recording medium 1 or 1A, this is not limitative, but the construction of the recording layer 4 can be changed as required, so long as it is configured to be capable of forming an area for mixing the first sub-recording film 4a and the second sub-recording film 4b with each other, when the laser beam L adjusted to the recording power is irradiated to the recording layer 4. More specifically, for example, the recording layer 4 can also be formed by interposing one or more very thin dielectric layers or the like between the first sub-recording film 4a and the second sub-recording film 4b, or alternatively it can be formed by interposing a layer made of a mixture of materials for forming the first sub-recording film 4a and the second sub-recording film 4b, between the sub-recording films 4a and 4b. Further, although in the above-described embodiments, the description has been given, by way of example, of the optical information recording medium 1 or 1A which includes the recording layer 4 comprised of two recording films, i.e. the first sub-recording film 4a and the second sub-recording film 4b, this is not limitative, but the recording layer according to the present invention can be configured to have not only the sub-recording films 4a and 4b but also one or more sub-recording films which are formed of a material containing an element selected from the group consisting of Si, Ge, C, Sn, Zn, and Cu, as the main component.

Further, although in the above-described embodiments, the description has been given of the optical information recording medium 1 which has the first sub-recording film 4a corresponding to the first recording film in the present invention formed toward i.e. closer to the light transmitting layer 6, and the second sub-recording film 4b corresponding to the second recording film in the present invention formed toward i.e. closer to the substrate 2, and the optical information recording medium 1A, which has the first sub-recording film 4a corresponding to the first recording film in the present invention formed toward the substrate 2A, and the second sub-recording film 4b corresponding to the second recording film in the present invention formed toward the protective layer 6A, this is not limitative, but in the construction adapted to irradiation of the laser beam L from the light transmitting layer side, it is possible to construct the optical information recording medium by forming the second sub-recording film 4b toward i.e. closer to the light transmitting layer 6, and the first sub-recording film 4a toward i.e. closer to the substrate 2, or in the construction adapted to irradiation of the laser beam L from the substrate 2A side, it is possible to construct the optical information recording medium by forming the second sub-recording film 4b toward i.e. closer to the substrate 2A, and the first sub-recording film 4a toward i.e. closer to the protective layer 6A.

Further, although in the above-described embodiments, the description has been given of the optical information recording media 1 and 1A, including the first dielectric layer 5a and the second dielectric layer 5b, this is not limitative, but the optical information recording medium according to the present invention encompasses optical information recording media which do not have one or any of the first dielectric layer 5a and the second dielectric layer 5b. Furthermore, although in the above-described embodiments, the description has been given of the optical information recording media 1 and 1A, including the reflective layer 3, this is not limitative, but the optical information recording medium according to the present invention encompasses optical information recording media which do not have the reflective layer 3. Further, although in the above-described embodiments, the description has been given of the example in which record data is recorded and reproduced by using the blue-violet laser beam L having a wavelength ($\lambda$) not less than 380 nm and not more than 450 nm (e.g. 405 nm), this is not limitative, but the optical information recording medium according to the present invention can be configured such that it is capable of recording and reproducing record data using various laser beams having a wavelength ($\lambda$) not less than 250 nm and not more than 900 nm. Furthermore, although in the above-described embodiments, the thicknesses of the respective layers are described only by way of examples, and this is not limitative, but of course they can be changed as required.

What is claimed is:

1. An optical information recording medium for recording and reproducing record data, comprising:
   a substrate; and
   a recording layer formed on the substrate, for having a laser beam irradiated thereto for recording and reproduction of the record data, the recording layer including a first recording film formed of a first material containing Si as a main component, and a second recording film formed of a second material containing Cu as a main component and having Si added thereto, the second recording film being formed in the vicinity of the first recording film.

2. An optical information recording medium as claimed in claim 1,
   wherein the second material has Si added thereto in an amount not less than 2 at % and not more than 45 at %.

3. An optical information recording medium as claimed in claim 2,
   wherein the second material has Si added thereto in an amount not less than 10 at % and not more than 35 at %.

4. An optical information recording medium as claimed in claim 1,
   wherein the recording layer is configured such that the first and second recording films are in contact with each other.

5. An optical information recording medium as claimed in claim 1, including a protective layer formed in a manner covering the recording layer.

6. An optical information recording medium as claimed in claim 5,
   wherein the protective layer is formed to be capable of transmitting the laser beam therethrough, the recording layer being formed by the second recording film and the first recording film, sequentially deposited on the substrate in the mentioned order, the optical information recording medium being configured such that the record data can be recorded and reproduced by irradiation of the laser beam to the recording layer from a protective layer side.

7. An optical information recording medium as claimed in claim 6, including a first dielectric layer formed between the recording layer and the protective layer, and a second dielectric layer formed between the substrate and the recording layer.

8. An optical information recording medium as claimed in claim 7, including a reflective layer formed between the substrate and the second dielectric layer.

9. An optical information recording medium for recording and reproducing data, comprising:
   a substrate: and
   a recording layer formed on the substrate, for having a laser beam irradiated thereto for recording and reproduction of the record data, the recording layer including a first recording film formed of a first material containing Si as a main component, and a second recording film formed of a second material containing Cu as a main component and having Si added thereto, the second recording film being formed in the vicinity of the first recording film;
   wherein the substrate is formed to be capable of transmitting the laser beam therethrough, the recording layer being formed by the first recording film and the second recording film, sequentially deposited on the substrate in the mentioned order, the optical information recording medium being configured such that the record data can be recorded and reproduced by irradiation of the laser beam to said recording layer from a substrate side.

10. An optical information recording medium for recording and reproducing record data, comprising:
    a substrate; and
    a recording layer formed on the substrate, for having a laser beam irradiated thereto for recording and reproduction of the record data; and
    a protective layer formed in a manner covering the recording layer, wherein the recording layer including a first recording film formed of a first material containing Si as a main component, and a second recording film formed of a second material containing Cu as a main comDonent and having Si added thereto, the second recording film being formed in the vicinity of the first recording film;
    wherein the substrate is formed to be capable of transmitting the laser beam therethrough, the recording layer being formed by the first recording film and the second recording film, sequentially deposited on the substrate in the mentioned order, the optical information recording medium being configured such that the record data can be recorded and reproduced by irradiation of the laser beam to said recording layer from a substrate side.

11. An optical information recording medium as claimed in claim 10, including a first dielectric layer formed between the substrate and the recording layer, and a second dielectric layer formed between the recording layer and the protective layer.

12. An optical information recording medium as claimed in claim 11, including a reflective layer formed between the second dielectric layer and the protective layer.

* * * * *

UNITED STATES PATENT AND TRADEMARK OFFICE
CERTIFICATE OF CORRECTION

PATENT NO. : 7,157,128 B2 Page 1 of 1
APPLICATION NO. : 10/896110
DATED : January 2, 2007
INVENTOR(S) : Inoue et al.

It is certified that error appears in the above-identified patent and that said Letters Patent is hereby corrected as shown below:

Column 20, line 36 (claim 10, line 12) of the printed patent, "comDonent" should be --component--.

Signed and Sealed this

Fourth Day of December, 2007

JON W. DUDAS
*Director of the United States Patent and Trademark Office*